United States Patent [19]

Hopf

[11] 4,122,607
[45] Oct. 31, 1978

[54] INSTRUMENT FOR MEASURING PREFORMED TUBES

[75] Inventor: Werner G. Hopf, Carpentersville, Ill.

[73] Assignee: Teledyne Industries, Inc., Aurora, Ill.

[21] Appl. No.: 753,603

[22] Filed: Dec. 22, 1976

[51] Int. Cl.² .............................................. G01B 5/00
[52] U.S. Cl. ............................ 33/174 L; 33/174 PC; 364/560
[58] Field of Search ............. 33/1 M, 174 L, 174 PC, 33/174 N, 178 E; 235/151.3, 92 DN

[56] References Cited

U.S. PATENT DOCUMENTS

| | | | |
|---|---|---|---|
| 3,438,133 | 4/1969 | Brault | 33/1 M |
| 3,636,635 | 1/1972 | Lemelson | 33/174 L |
| 3,944,798 | 3/1976 | Eaton | 33/174 PC |

FOREIGN PATENT DOCUMENTS 1,329,708  9/1973  United Kingdom .................. 33/174 N

*Primary Examiner*—Richard R. Stearns
*Attorney, Agent, or Firm*—Wegner, Stellman, McCord, Wiles & Wood

[57] ABSTRACT

An instrument for measuring the position of points along a straight portion of a preformed rod, tube or pipe element with respect to a reference point. The measurements may be converted to vectors representing the straight portions, and used to generate instructions to a bending machine for manufacturing a reproduction of the preformed element, hereinafter generally referred to as a tube. A column is attached to a carriage which moves along one edge of a work table on which the tube is supported. The column has an upper end at which a first arm is pivoted for movement in a vertical plane. A second arm having a carrier mounted at its end is pivoted to the first arm for further movement in the vertical plane. The carrier swivels about the axis of the second arm and has an offset end portion on which a tube feeler is mounted. The feeler has surfaces for engaging the preformed tube. When the tube is engaged by the tube feeler, projections of the axis of the second arm and the axis of the tube feeler intersect at the centerline of the tube. Resolvers provide signals indicating the location of the carriage and the angles of the two arms, collectively defining the position of the intersection of the axes projections. The operator manually adjusts the tube feeler into engagement with the tube and a switch is actuated to record the resolver signals.

17 Claims, 6 Drawing Figures

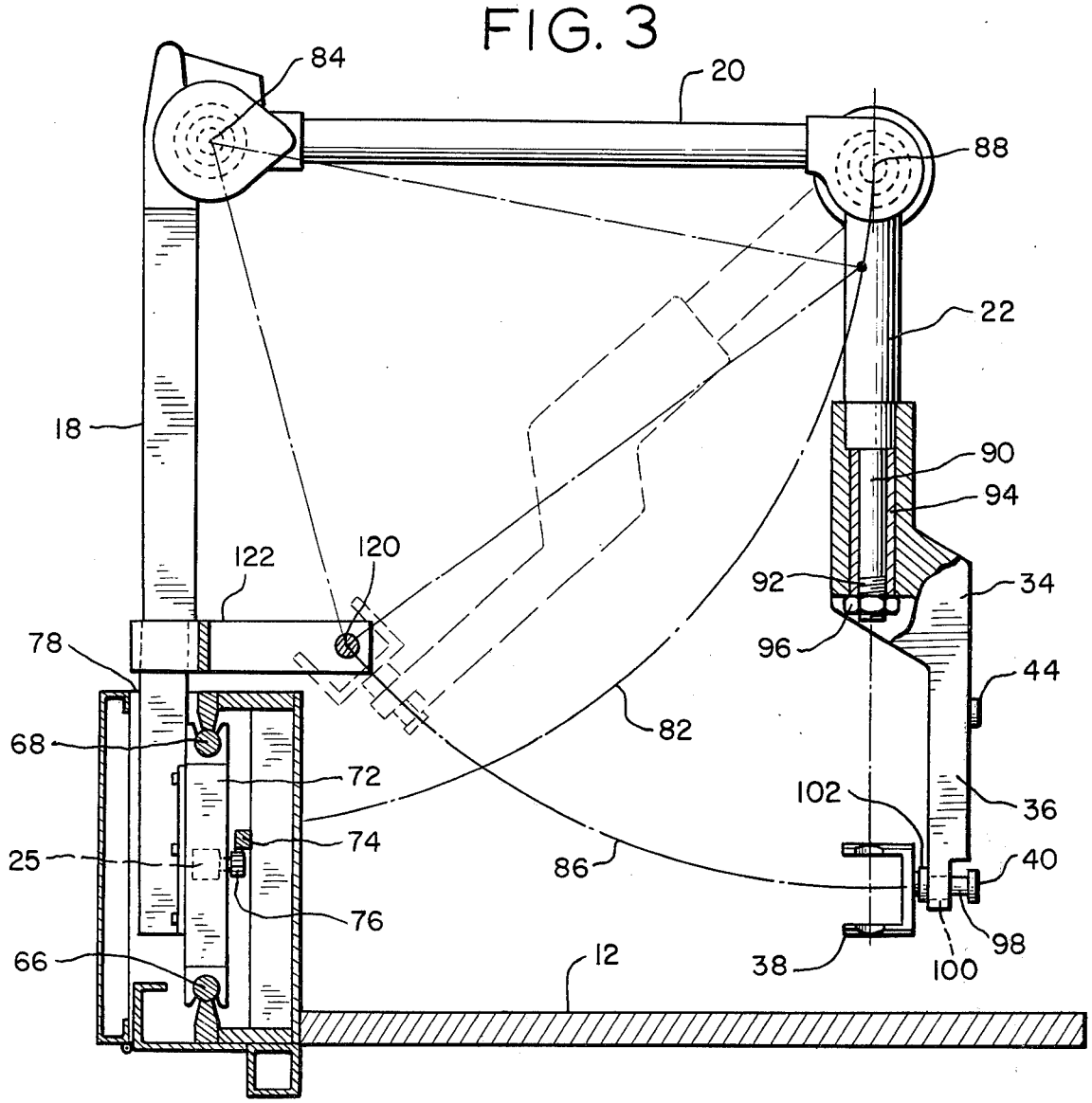
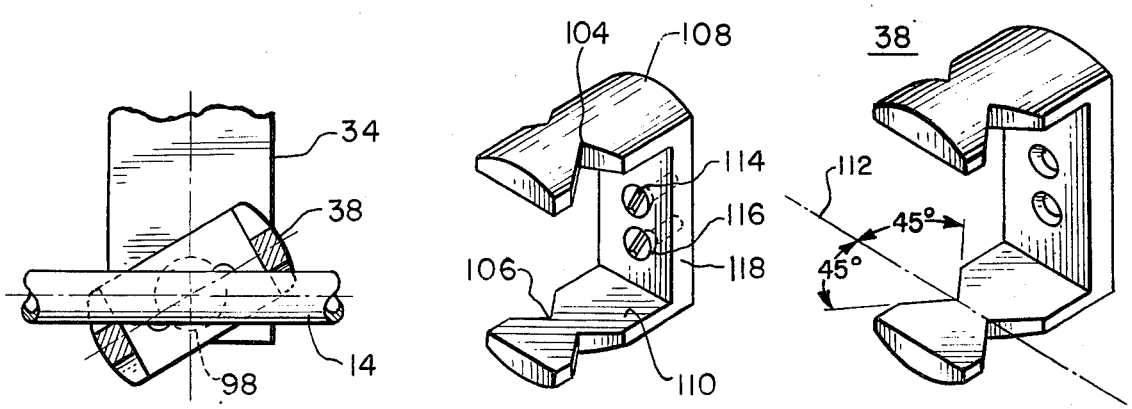

INSTRUMENT FOR MEASURING PREFORMED TUBES

BACKGROUND OF THE INVENTION

This invention relates to an instrument which measures the position of various points of interest in a three-dimensional space and, more particularly, to an instrument which measures the position of points along straight portions of a preformed tube. The measurements may be converted to vectors which can be used to generate instructions to a bending machine to manufacture reproductions of the preformed tube.

U.S. Pat. No. 3,944,798, to Eaton, discloses an apparatus for measuring the angles of a surface or axis of an object with respect to three reference planes. The apparatus includes a working head which may be engaged with a surface of the object being measured. The head is mounted in an articulate manner through a series of five pivoted arms to a work table. Each joint between supporting arms has a sensor or resolver which measures the relative angular positions of the arms to collectively define the position of the working head. A circuit processes the signals from the five analog sensors to calculate the relative position of the working head.

British Pat. No. 1,329,708 issued to McMurtry describes a method for making a bent pipe from a master pipe based upon measurements taken from the master pipe. McMurtry shows a measuring apparatus having a sensing head mounted for rectilinear movement in the X, Y and Z directions. McMurtry's apparatus has an arm upon which is mounted a carrier having an offset end portion. A sensing head having an outwardly opening U-shaped cross section is mounted on the offset end portion to receive the surface of the pipe. A projection of the axis of the arm intersects the axis of the sensing head at the centerline of the pipe when the surface of the pipe is in engagement with the sensing head. McMurtry obtains measurements of the centerline coordinates at two locations for each straight portion of the bent tube. The coordinates of the point on the centerline of the straight portions of the pipe are utilized to calculate a bending program.

Eaton requires five analog sensors or resolvers to acquire sufficient information to develop a bending program. McMurtry must adjust the position of the offset end or change the size of the sensing head to accommodate individual tube diameters.

Considering these drawbacks, I have developed an instrument which requires only three resolvers and engages the surface of the tube to effect an accurate measurement of the position of points along the centerline of the straight portions thereof. A single sensor or tube feeler accommodates a range of tube diameters.

SUMMARY OF THE INVENTION

A preformed tube which is to be measured is placed on a work table. An instrument having a carriage moves linearly along an edge of the work table. A first resolver, coupled to the carriage, provides a signal proportional to the position of the carriage. A first and a second arm are coupled to the carriage for pivotal movement in a vertical plane and a second and a third resolver are located at the pivots. The second and the third resolvers provide signals proportional to the arcuate position of the arm. A carrier having an offset end swivels about the axis of the second arm. A U-shaped tube feeler having two substantially parallel legs is mounted for rotation on the offset end portion of the carrier, the legs adapted to engage the offset surface of the preformed tube. When the tube feeler is engaged with the surface of the tube, a projection of the axis of the second arm and a projection of the axis of the tube feeler intersect at a point on the centerline of the tube. The instrument is manually positioned at two points on each straight portion of the tube and the signals from the three resolvers are recorded for each point.

A feature of the present invention is to provide a carrier having an offset end on which is mounted a tube feeler capable of engaging the surfaces of tubes having different diameters.

Another feature of the present invention is to provide an instrument wherein the axis of the second arm intersects the axis of the tube feeler so that when the tube feeler engages the tube, the intersection of the axes lies on the centerline of the tube.

Another feature of the present invention is to provide an outwardly opening U-shaped tube feeler having "V" recesses in opposite legs to engage opposite sides of a tube to be measured.

Yet another feature of the invention is to provide various size tube feelers which are easily removable to accommodate a wide range of tube diameters.

These and other features of the invention will become more readily apparent when considering the specification in combination with the drawing.

DRAWING

FIG. 3 is a sectional view of the instrument along line 3–3 of FIG. 1;

FIG. 4 is an elevation of the tube feeler along line 4—4 of FIG. 2; and

FIGS. 5 and 6 depict two sizes of tube feelers.

DESCRIPTION OF PREFERRED EMBODIMENT

Figure 1:
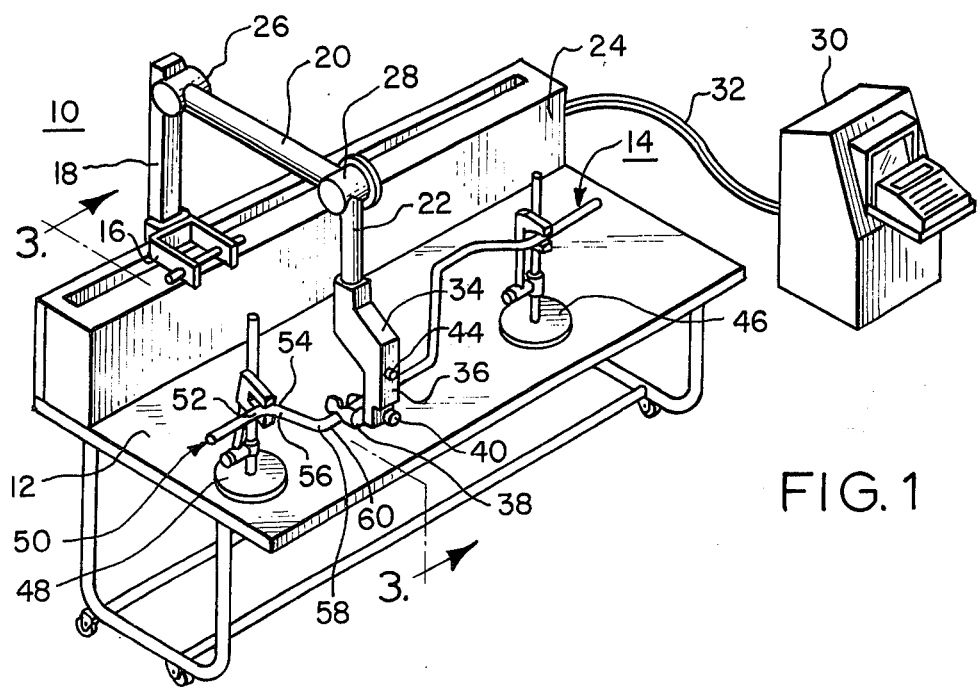
FIG. 1 is a perspective view of the instrument.

Referring to FIG. 1, the instrument 10 is shown positioned on table 12 where a preformed tube 14 is to be measured. A carriage 16, having a vertical column 18 and pivoted arms 20 and 22, moves linearly along work table 12 in housing 24. A linear sensor 25 (FIG. 2) provides a signal indicative of the position of the carriage 16 along table 12. Rotary sensors 26 and 28 are mounted at the pivots of arms 20 and 22. The linear sensor 25 and the rotary sensors 26 and 28 collectively provide position information to the processor 30 by way of line 32. Carrier 34 is mounted on arm 22 for swiveling around the axis of arm 22. The carrier 34 has an offset end portion 36 on which is rotatably mounted a U-shaped tube feeler 38. The tube feeler 38 may be rotated by knob 40 to engage selected points along tube 14. As will appear in more detail below, the axis of the arm 22 intersects the axis of the tube feeler 38, and when the tube feeler engages the surface of tube 14, the point of intersection is on the centerline of the tube. The output of the linear sensor and the two rotary sensors define the location of the intersection. Switch 44 is depressed to record signals from the sensors with which the position of the intersection is calculated.

A measurement of the tube 14 will now be explained. Stands 46 and 48 support the tube 14 to provide access by the tube feeler 38. The stands are of a height sufficient to hold the tube 14 above the surface of table 12 so that the tube feeler 38 may be engaged at selected points along the tube surface. Carrier 34 is manually positioned to the end of work table 12, and knob 40 is rotated so that the tube feeler 38 may be engaged with point 50 at the end of the tube. When the tube feeler 38 is suitably engaged with the tube 14 in a manner similar to the engagement shown in FIG. 4, switch 44 is depressed and the position of the centerline of the tube is entered into processor 30. The tube feeler 38 is then moved from left to right, as shown in FIG. 1, to point 52, which point is adjacent bend 54. The tube feeler 38 is again engaged against the surface of tube 14. The switch 44 is depressed for the second time to cause the recording of the position of the centerline of tube 14. Thus, a vector representing a straight portion of the tube is established by the points 50 and 54. The tube feeler 38 is then disengaged from the surface of tube 14, repositioned and engaged at point 56, which point is adjacent bend 54. Switch 44 is depressed for a third time. The tube feeler 38 is manually positioned to the next point, point 58, along tube 14. Point 58 is adjacent bend 60. When the tube feeler 38 is suitably engaged with the surface of tube 14, switch 44 is then closed for a fourth time to enter the position of the centerline of the tube into processor 30. Manual positioning of instrument 10 is continued along the tube 14, and measurements are taken in a manner similar to that described until each straight portion of the tube 14 has been measured. The processor 30 accepts pairs of points which define the vectors that represent the straight portions of tube 14. A bending program may be established from the vector information, as in Eaton or McMurtry.

Figure 2:
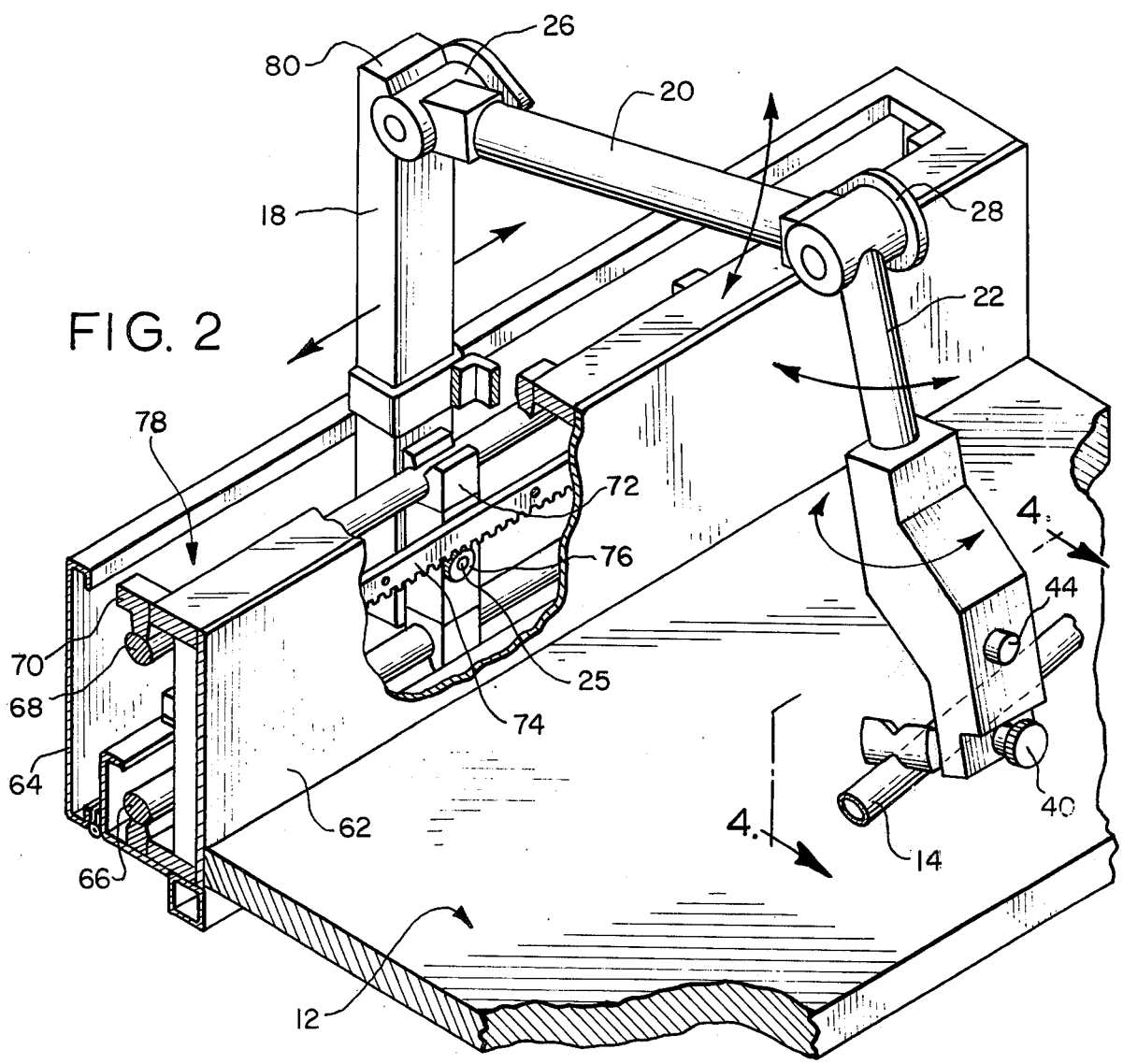
FIG. 2 is an enlarged perspective view of the instrument with a panel broken away to expose the carrier.

Referring to FIGS. 2 and 3, work table 12 is of sufficient size to accommodate various preformed tubes to be measured and has a housing 62 along the rear edge. Access to the housing may be obtained through a rear panel 64. The housing 62 encloses a track such as rails 66 and 68 which traverse the length of table 12. The rails have blocks 70 at their ends to stop the movement of carriage 72 and provide a reference for the calibration of sensor 25, as will be discussed below. Rack 74, also attached to the housing 62, extends the length of the table 12. Rack 74 engages gear 76 of linear sensor 25 causing the sensor to provide a signal indicative of the position of carriage 72 along table 12.

Column 18 is attached to the carriage 72 and projects through channel 78 of housing 62. Column 18 has an upper end 80 which receives rotary sensor 26 and arm 20. Arm 20 is pivotally attached to column 18 and provides for arcuate movement in a vertical plane, as best seen in FIG. 3. Arm 20 swings in an arc 82 having a center 84. The other end of arm 20 receives a second arm 22. Arm 22 pivots about arm 20 in the same plane as arm 20 pivots with respect to column 18. Arm 22 swings in an arc 86 having a center 88 (FIG. 3). Arm 22 terminates in an axially extending stud 90 having threads 92 at its end.

Carrier 34 has an axis which is parallel to, and as shown in the figures may be coincident with, a projection of the axis of arm 22. Carrier 34 is coupled to arm 22 by stud 90. Specifically, stud 90 receives carrier 34 by collar 94 which is secured by nut 96. The arrangement of the stud 90 and the nut 96, holding the collar 94, permits carrier 34 to swivel about the axis of arm 22. Collar 94 may include a stopping detent (not shown) to preclude rotation of carrier 34 about stud 90 in excess of 360°. Carrier 34 has an offset end 36 which receives tube feeler 38. The amount of offset of carrier 34 must be sufficiently large to permit tube feeler 38 to lie within the projection of the axis of arm 22, as will be explained below.

Tube feeler 38 is coupled to the offset end 36 by shaft 98. Shaft 98 is attached to knob 40 and projects through bore 100 to receive a plate 102 on which tube feeler 38 may be mounted. Tube feeler 38 is rotatable about the axis of shaft 98 and is positioned by knob 40.

The tube feeler 38 is mounted on carrier 34 so that the project of the axis of arm 22 intersects the axis of shaft 98. Opposing "V" recesses 104 and 106 in opposite sides of legs 108 and 110 are so located that a line between the vertices extends through the intersection of the projections of the axis of arm 22 and the axis of shaft 98. With the edges of the "V" recesses engaged with a straight portion of tube 14, the intersection lies on the tube centerline. The angle at which the sides of the "V" recesses are cut should be symmetrical with centerline 112, as shown in FIG. 6. Although a variety of angles may be selected, a 45° angle from centerline 112 is desirable.

Tube feeler 38 may be detachably mounted on plate 102 by screws 114 and 116 through back 118. However, any suitable means of connecting tube feeler 38 to carrier 34 would be acceptable as long as the projection of shaft 98 intersects the projection of the axis of the second arm 22.

A single size tube feeler may accommodate a range of tube diameters. However, several different tube feeler sizes may be required to accommodate tube diameters of different ranges. Although the sizes of the various tube feelers may be different, each must provide for the intersection of the projection of the axis of arm 22 with the axis of shaft 98 at the centerline of the tube to be engaged. As long as this relationship is maintained, any particular size tube feeler may be employed.

To acquire an accurate bending program, it is important that sensors 25, 26 and 28 are calibrated before measurements of the tube are taken. The calibration of linear sensor 25 is effected when carriage 72 is positioned against stop 70. With the carriage in this position, the signal from sensor 25 is related to the reference position. Sensors 26 and 28 may be calibrated by engaging tube feeler 38 with reference bar 120. Specifically, tube feeler 38 may be engaged with reference bar 120, which is held in yoke 122. When tube feeler 38 is in this position, sensors 26 and 28 provide signals indicative of a reference position of arms 20 and 22. When each of the three sensors has been appropriately calibrated, the signals provided to processor 30, as collectively developed by sensors 25, 26 and 28, will denote the position of tube feeler 38.

Various modifications to the invention will become apparent after review of the specification. For example, the axis of tube feeler 38 need not be perpendicular to the axis of carrier 34. Carrier 34 could have a second offset to provide for improved operator access to knob 40. This particular structure requires that the intersection of the projection of arm 22 intersect the projection of the axis of tube feeler 38 at the centerline of the tube when engaged.

I claim:

1. In an apparatus for measuring a location of a point along a straight portion of a preformed tube or pipe, said apparatus including means for mounting the tube or pipe in a known position, a member defining a first axis, means for positioning said member with respect to said tube, and means for sensing the position of said member, the improvement comprising:

tube feeler means mounted on said member and having surfaces shaped and positioned to engage opposite sides of the tube, said tube feeler means defining a second axis which intersects a projection of said first axis to form an intersection therewith, wherein said intersection lies at the centerline of the tube when said surfaces engage said opposite sides of said tube.

2. The device as claimed in claim 1 wherein the tube feeler means is an outwardly opening U-shaped member having a first and a second leg, said tube feeler means mounted for rotation about the second axis so that said first and second legs are parallel to said second axis.

3. The device as claimed in claim 1 wherein the tube feeler means is an outwardly opening U-shaped member having a first and a second leg, "V" recesses on the first and second legs, a line between the vertices of the "V" recesses being intersected by the projection of the first axis and the second axis.

4. The tube feeler means as claimed in claim 3 wherein the "V" recesses are located on opposing surfaces of the first and second legs.

5. The tube feeler means as claimed in claim 4 wherein the first and the second legs are generally parallel to each other and separated from each other by a back portion, said back portion receiving a shaft projecting from said member, the axis of said shaft defining the second axis.

6. An instrument for measuring the location of points along straight portions of a preformed tube positioned on a work surface comprising:
  carriage means for providing linear movement along a work surface;
  a first arm having a first end and a second end, the first end of the first arm pivoted to the carriage means for pivotal movement;
  a second arm having a first end and a second end, the first end of the second arm pivoted at the second end of the first arm for pivotal movement;
  a carrier defining an axis parallel to the axis of the second arm, said carrier mounted on said second arm to swivel about the axis of said second arm, said carrier having an end portion offset from the axis of the second arm;
  tube feeler means mounted on the offset end portion of the carrier, the tube feeler means being shaped and mounted to engage the tube at opposite sides thereof, the tube feeler means defining an axis the projection of which intersects a projection of the axis of the second arm at the centerline of the tube with the feeler means in engagement with the tube sides; and
  means for sensing the position of the carriage means, the first arm and the carrier to provide signals representing the position in space of the intersection of the axes of the feeler means and the second arm.

7. The instrument as claimed in claim 6 wherein the tube feeler means is mounted on the offset end portion of a carrier for rotation about its axis.

8. The instrument as claimed in claim 6 wherein the axis of the tube feeler means is perpendicular to the axis of the second arm.

9. The instrument as claimed in claim 6 wherein the tube feeler means includes an outwardly opening U-shaped member having a first and a second leg, and "V" recesses on opposing edges of the first and second legs.

10. The instrument as claimed in claim 9 wherein a shaft is connected to the U-shaped member rotatably mounting the U-shaped member on the offset end portion.

11. The instrument as claimed in claim 10 wherein a knob is attached to the shaft for manipulation thereof.

12. The instrument as claimed in claim 10 wherein the first and the second legs are generally parallel to each other and separated from each other by a back portion connecting said first and second legs, said back portion adapted to receive the shaft, and the shaft lies on the axis of the U-shaped member.

13. The instrument as claimed in claim 6 wherein the axis of the second arm is coincident with the axis of the carrier.

14. The instrument as claimed in claim 6 wherein the sensing means includes:
  a first resolver coupled to the carriage means providing a first signal indicative of the position of the carriage means;
  a second resolver coupled to the carriage means and the first arm providing a signal indicative of the angle between the first arm and the carriage means; and
  a third resolver coupled to the first arm and the second arm providing a signal indicative of the angle between the first arm and the second arm.

15. An instrument for measuring points along straight portions of a preformed tube positioned on a work surface comprising:
  a carriage means for providing linear movement along a work surface;
  a column affixed to the carriage means;
  a first arm having a first end and a second end, the first end of the first arm pivoted at the column for pivotal movement in a vertical plane;
  a second arm defining an axis and having a first and a second end, the first end of the second arm pivoted at the second end of the first arm for pivotal movement in said vertical plane;
  a carrier defining an axis coincident with the axis of the second arm, said carrier mounted on said second arm to swivel about the axis of said second arm, said carrier having an end portion offset from the axis;
  tube feeler means defining an axis and mounted on the offset end portion of the carrier, the tube feeler means being shaped and mounted to engage opposite sides of a tube so that a projection of the axis of the second arm and a projection of the axis of the tube feeler means intersect at the center of the tube; and
  means for sensing the positions of the carriage, the first arm, and the carrier to provide a signal indicative of the position of the intersection of the second arm axis and the tube feeler axis.

16. The instrument as claimed in claim 15 wherein the tube feeler means includes an outwardly opening U-shaped member having a first and a second leg, opposing "V" recesses located on the legs so that when the tube feeler is mounted on the offset end portion of the carrier, a line between the vertices of the "V" recesses intersects the projections of the arm and tube feeler axes.

17. An instrument for measuring the location of points along straight portions of a preformed tube positioned on a work surface comprising:
  a table having a work surface;

track means attached to the table and located along the length of the work surface;

a carriage mounted on the track means for movement therealong;

a stop at the end of the track means to provide a reference position for the carriage;

a first resolver coupled to the carriage and the table providing a first signal indicative of the position of the carriage with respect to the reference position;

a vertical column attached to the carriage and having an upper end;

a first arm having a first and a second end, the first end of the first arm coupled to the upper end of the column for pivotal movement in a vertical plane;

a second resolver coupled to the upper end of the first arm and the upper end of the column providing a signal indicative of the angle between the column and the first arm;

a second arm having a first end and a second end, the first end of the second arm coupled to the second end of the first arm for pivotal movement in said vertical plane;

a third resolver coupled to the second end of the first arm and the first end of the second arm providing a third signal indicative of the angle between the axis of the second arm and the axis of the first arm;

a carrier having a first end and a second end, said second end being offset from the first end thereof, said first end of said carrier mounted on said second arm to swivel about the axis of the second arm;

tube feeler means mounted on said second end of the carrier, the tube feeler means having an axis and being shaped and positioned to engage opposite sides of a tube so that a projection of the axis of the second arm and a projection of the axis of the tube feeler means intersect at the centerline of the tube; and a reference bar mounted on the column to provide a reference position for the second and third resolvers.

* * * * *